United States Patent [19]

Wigley

[11] Patent Number: 4,903,494
[45] Date of Patent: Feb. 27, 1990

[54] METHOD FOR PREPARING ICE FOR TRANSPORTATION

[76] Inventor: Freddie J. Wigley, 118 N. Ash, Ponca City, Okla. 74601

[21] Appl. No.: 396,092

[22] Filed: Aug. 21, 1989

[51] Int. Cl.⁴ .............................................. B65B 63/08
[52] U.S. Cl. .......................................... 62/60; 53/440; 53/447; 53/449
[58] Field of Search ...................... 62/60, 371; 53/440, 53/447, 449, 465

[56] References Cited

U.S. PATENT DOCUMENTS

| | | | |
|---|---|---|---|
| 1,825,068 | 9/1931 | Jones et al. | 62/60 |
| 2,942,428 | 6/1960 | Morrison | 62/60 |
| 3,529,717 | 9/1970 | McDougal | 53/447 X |
| 3,670,880 | 6/1972 | Burleson et al. | 53/449 X |
| 3,864,936 | 1/1974 | Frank et al. | 62/385 |
| 3,867,806 | 2/1975 | Lancaster, III et al. | 53/465 X |
| 4,079,566 | 3/1978 | Stoecklin | 53/449 X |
| 4,484,448 | 11/1984 | Crabb, Jr. | 62/60 X |
| 4,841,711 | 6/1989 | Lems et al. | 53/449 X |
| 4,852,330 | 8/1989 | Carangelo | 53/447 X |

Primary Examiner—William E. Tapolcal
Attorney, Agent, or Firm—William J. Miller

[57] ABSTRACT

A method for preparing a quantity of ice for transportation to a remote location consisting of bagging a plurality of bags of ice, then stacking the frozen bags of ice vertically on a pallet to a predetermined height. The pallet is wrapped with a material to form a first assembled unit. The unit is then placed in a freezer having a temperature at or below 20° F. for a period of time sufficient to set the product. Once "set", the unit is boxed in a rigid container having sidewalls and a lid. The sidewalls are banded to form a rigid second assembly and the second assembly which is returned to the freezer for storage until it is transported to a remote location.

8 Claims, 2 Drawing Sheets

METHOD FOR PREPARING ICE FOR TRANSPORTATION

BRIEF DESCRIPTION OF THE PRIOR ART

The best prior known to Applicant is the inventor's owned U.S. Pat. No. 4,741,167 issued May 3, 1988, entitled "Method and Apparatus for Transporting of Perishable Materials". In that patent, a method of transportation is disclosed wherein a rack is filled with ice products and a flexible insulated container is wrapped around and strapped tightly to the container to prevent the product inside from deteriorating. Dry ice is placed in the top of the container to provide cooling to the material inside the container during transportation.

U.S. Pat. No. 3,864,936 issued to Martin Frank et al., entitled "Container for Shipping Perishables" is a similarly described patent wherein a container has insulated sidewalls, top and bottom which tend to preserve the perishables in the container.

BRIEF DESCRIPTION OF THE INVENTION

This application relates to an entirely new concept for the handling of ice during its preparation for transportation, the storage prior to transportation and the ultimate transportation of the ice to a remote location.

The invention essentially comprises a method for handling ice from the actual location where the ice is bagged to the ultimate user of the ice wherein the handling is done in a manner to reduce the actual handling costs to a bare minimum.

The method essentially comprises taking the newly bagged ice off the conveyor from the bagging machines in an ice plant, for example, and stacking the ice on a pallet to a desired height. In the preferred embodiment, the ice is stacked in layers of fifteen bags with fourteen layers making a total of 210, eight pound bags. The entire unit when stacked weights approximately 1,640 pounds.

The ice, in this condition, is newly formed and generally has a liquid coating over the ice. Once the ice is stacked, the stack must be horizontally and vertically stabilized before it can be moved. The best method for horizontally stabilizing the ice so that the ice can not shift during movement is to wrap the entire stack of ice in a stretch plastic. Once the stack is wrapped, a hand or machine loader can be inserted into the pallet, rising the pallet off the floor and moving the ice into a cold room or freezer having a temperature of 20° F. or colder. The ice remains in the room until it is "set"; that a condition where the ice cubes will tend to freeze together and the bags will tend to settle to a rigid configuration. The "set" bags are then ready for transportation. The approximate time normally used to convert fresh ice to the "set" condition is eight hours at 20° F. when prepared as previous described. The thin layer of plastic wrapped around the ice permits easy transportation of the cold temperature into and through the bundle of ice while maintaining the ice in a rigid position.

It is extremely important to maintain the ice in a rigid position since the ice must later be inserted into a merchandising box having very narrow tolerances horizontally so that the ice must not shift outside the horizontal limits. For example, the merchandising box has approximately two inches clearance on each side of the stacked ice. Once the ice is cured, the preferred transportation system comprises placing a cardboard container completely around the ice and banding the cardboard container. The easiest method to band the cardboard container is to wrap the cardboard container with stretch plastic. The cardboard container contains cover lids which will completely cover the top of the ice and preferrably overlap each other by at least three inches. Once the box has been prepared as described above, it is ready for transportation. The box, prior to transportation, is filled with a quantity of dry ice, depending upon the length of time the box will be in a nonrefrigerated location. The unit is then inserted into a medium temperature truck, generally having a temperature designed to transport vegetables and the like which truck is approximately 60° F. or under. The box is then transported to a store which is merchandising the ice. Most large stores used for merchandising ice have freezer areas in the store. Such freezer areas are often used to store the assembled unit until it is ready for inserting into a merchandiser. Such merchandiser is clearly described in the Application entitled "Method and Apparatus for Loading a Product in an Enclosed Box", application Ser. No. 333,012, pending filed April 4, 1989, by the same inventor as this Application.

The merchandising stores can store these assembled units of ice in their freezer regions for extended periods of time, for example, over long weekends, and can assemble several of these units in the stores and in addition can stack the units one on top of the other, thus, saving a considerable amount of space for the store. The normal store moving equipment can easily accommodate inserting the prongs of the moving equipment into the pallet, lifting the pallet either stacked or on the floor, moving the pallet to the ice merchandiser as described in the aforementioned Application and inserting the ice, once the box and outer wrap is removed, the pallets is moved into the ice merchandiser. The inner wrap, if present, is then removed. Such period of time is normally less than five minutes, substantially reducing the handling costs for moving and storing ice.

DETAILED DESCRIPTION OF THE INVENTION

The normal method for preparing ice for transportation to a remote location essentially comprises bagging ice into plastic bags having a weight of eight pounds. Once the ice is bagged, the ice is then "baled" into bales of six bags. Then the bales are is moved into a cold storage unit until they are ready for transportation. The ice is normally set, as previously described, so that it can be easily transported. Each of the bales are then transported into a truck having a temperature of 20° F. or less where the bales are then transported individually from the ice company to the various locations where the boxes for merchandising the ice are located. The ice is then inserted into the ice merchandising apparatus by cutting the bales and placing the individual bags into the ice merchandising boxes.

The biggest problem with this process is that during the transportation of the ice and the inserting of the ice into the boxes, the ice tends to melt, causing the bags to stick together and on many occasions become damaged upon attempted removal from the box. Secondly, the ice at the bottom seldom gets sold, thereby causing the ice cubes in the bags to freeze into a solid cube of ice because of the weight of the ice bags above the bottom bags causing melting of the ice through weight. These bags, therefore, are generally discarded as being unsalable with a lost to the ice company of the bags. The only way the bottom bags can be sold to prevent the above from occurring is to remove all the bags from the freezer at the time freezer is refilled and then placing the old bags on top. Such a process is extremely time consuming and generally results in the loss of several bags due to ripping or tearing of the plastic and the melting of the product while it sits outside the merchandiser waiting for their merchandiser to fill with new bags. Once the plastic on any bag is ripped, it can not be merchandised.

Figure 1:
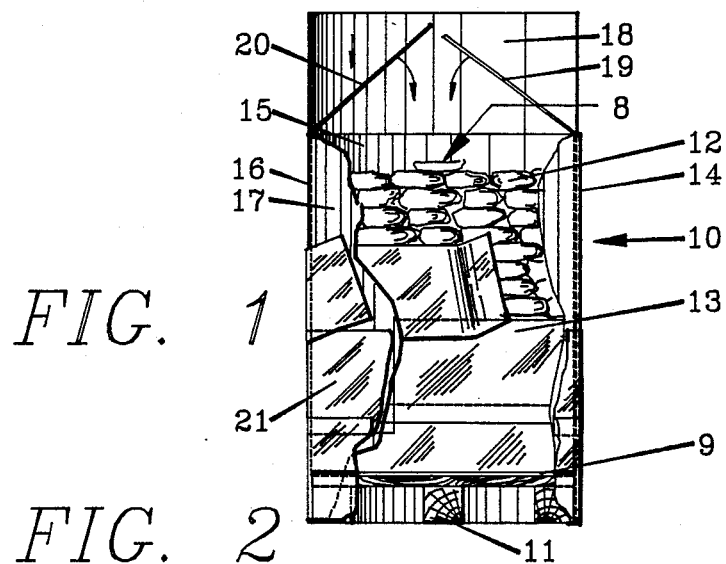
FIG. 1 illustrates a fully assembled unit ready for transportation to a remote location.
Figure 2:
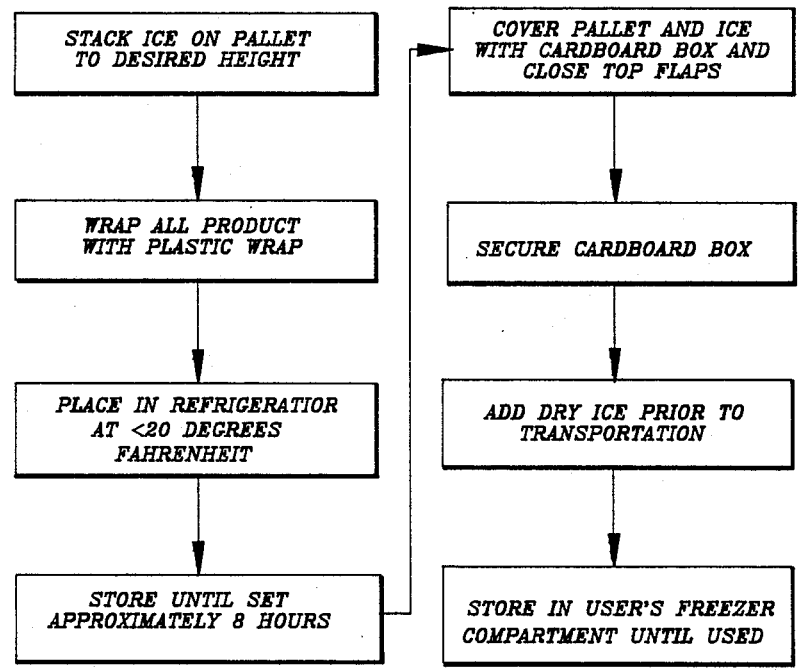
FIG. 2 is the process used to prepare the ice into an assembled unit illustrated in FIG. 1.

This invention describes an entirely new method for merchandising ice. Such new method basically consists of preparing the ice for insertion into the merchandiser at the time the bags of ice are removed from the bagging machine. Referring to FIGS. 1 and 2, the method essentially comprises removing the ice from the bagging machine and stacking it in layers on a pallet which is normally 40" wide by 48" long. Each layer generally consists of fifteen bags. The bags are stacked to a height of approximately fourteen bags, making a total of 210 bags on a pallet. Such a pallet generally weights approximately 1,640 pounds when loaded with ice. The ice, when first removed from the bagging machine, is wet and needs to be cooled so that it will "set". The stack of 210 bags can easily shift if it is moved since the ice is covered with liquid and the bags are generally unsettled; that is the ice cubes can move freely within the bags so that any movement of the pallet with the ice in this condition will generally cause the stack to shift or fall from the pallet. In order to prevent such an occurrence, the pallet is wrapped with a stretchable plastic, such as plastic wrap or other type stretchable plastic from the pallet to the top of the ice. The ice, once secured, can now be transported easily to a cold storage or refrigerated room where the ice is subjected to a temperature of 20° F. or cooler until the ice is "set"; that is until the ice cubes inside each individual bag have frozen to each other and the bags have settled into a rigid configuration. Once the bags are configured and frozen, the stack becomes extremely stable. The stack is then surrounded preferably by cardboard in a manner to totally enclose the pallet and the stacked bags of ice to a height higher than the top layer of ice.

In the preferred embodiment of this invention the ice is generally stacked so that the pallet and the ice will reach approximately 50". The cardboard cover is then sized to fit around the pallet with a portion left over so that the cardboard can be easily secured around the pallet. Banding is then placed around the cardboard to secure the cardboard to the pallet and to the ice stack. Such banding can be accomplished by any usual method, the easiest method is to wrap stretch plastic around the cardboard. The cardboard is also configured to have top lids which will fold down over the ice stack and overlap by at least 3".

Referring to FIG. 1, an assembled unit 10 is illustrated having a pallet generally referred to by arrow 11. A piece of cardboard 9 is placed on the top of pallet 11 with ice 12 stacked thereon. Cardboard 9 directs the movement of carbon dioxide air around the outside of cardboard box as it falls and prevents the influx of warm air up through the center of ice 12 between the boards of pallet 11. Ice 12 is stacked, as previously described, in layers of fifteen bags each and having a total of approximately fourteen layers. The ice in this configuration is then wrapped in a plastic 13 completely around ice 12 and to the top of stack of ice 12. Pallet 11 having ice 12 thereon is then placed in a refrigerator at 20° F. or less for approximately eight hours until it is "set". Once ice 12 is "set", then it is covered with a cardboard box having side portions 14, 15, 16 and a front portion 17 with an Overlapping portion (see FIG. 3), not illustrated which is used mainly to secure and seal front portion 17 of the box to side portion 14. The box has a plurality of lids. A lid 18 is attached to back portion 19 and a lid 20 is attached to side portion 16. A lid not shown, similar to lid 18 is attached to front portion 17. The cardboard box is generally placed completely to the bottom of pallet 11, as illustrated, in order to better stabilize unit 10. Once the cardboard is placed around unit 10 it is banded by any of several methods, but the easiest being an outer stretch plastic wrapping 21 which is placed completely around the cardboard box side portions 14, 5, 16 and 17. Thus, making the box a secure unit for transportation. Lids 18, 19, 20 and 23 (see FIG. 3) are folded down against the top of ice stack 12 to prevent entrance of heat during transportation. Lids 8, 19, 20 and 23 also provide access to the inside of the box for the insertion of powdered or fractured dry ice 8 to render the box cold enough for transportation in a medium storage unit. Such transportation methods have been completely described in Applicant's copending application Ser. No. 333,012, previously described and does not form a part of this invention.

Figure 3:
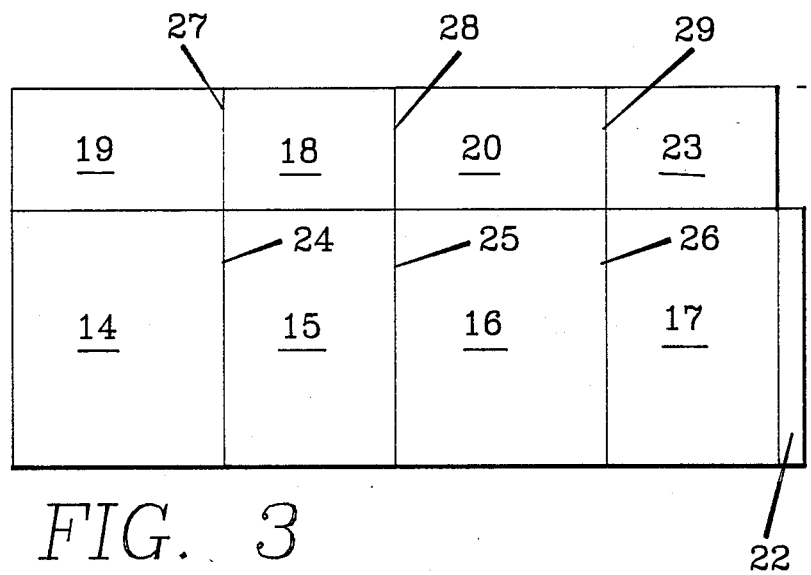
FIG. 3 illustrates a layout of the cardboard box material.

The cardboard container utilized for the preferred embodiment is illustrated in FIG. 3 and comprises side portion 14, back portion 15, second side portion 16 and front portion 17 with flap 22 used to fold around the box in order to improve its sealing capabilities and its ability to form a rigid structure. The box additionally includes previously described lid 19 which is attached to side portion 14, lid 18 which is attached to back portion 15, lid 20 which is attached second side portion 16 and a lid 23 which is attached to front portion 17.

In the preferred embodiment, all of panels 14, 15, 16 and 17 are 54" high with creases 24, 25 and 26, respectively, between each of front, side and back portions 14 through 17, respectively. Cuts 27, 28 and 29 provide a method for easily forming lids 18, 19, 20 and 23.

Figure 4:
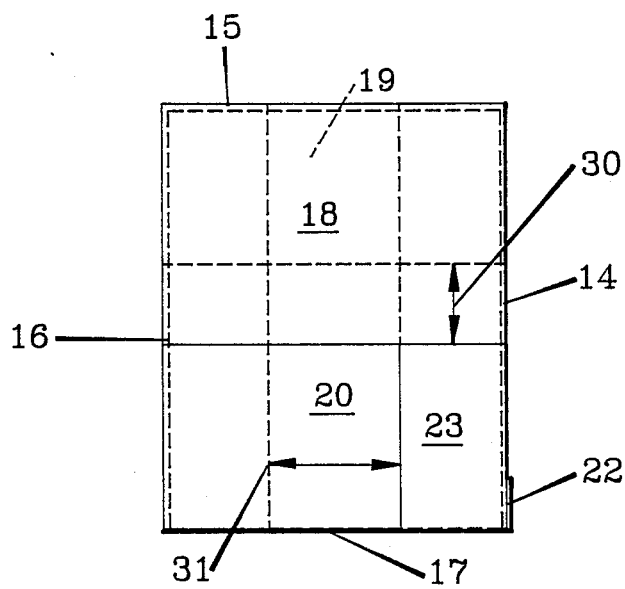
FIG. 4 illustrates a top view of the cardboard illustrating the overlap of the lids.

A top view of the box is illustrated in FIG. 4 and illustrates an overlap 30 for lids 18 and 23 illustrated by dotted lines and an overlap 31 for lids 19 and 20 illustrated by dotted lines.

It is obvious that if the ice is prepared and bagged in a cold room, such as a room of 20° F. or colder and is already "set", then it can be sacked on pallet 11 immediately and wrapped in the initial plastic wrapping or in the cardboard with outer banding. In order to stabilize the ice against horizontal shifting. However, even ice packaged in a cold room will perform better if it has been allowed to initially "set"; that is to rest for a period of time in the cold room so that the bags can acquire and conformed to their particular stacking configurations prior to being transported, thereby tending to stabilize the entire unit prior to transportation.

CONCLUSIONS

A new method for ice preparation prior to transportation has been illustrated. Such method provides for the handling of a large quantity of ice in an extremely easy manner; that is, the method provides for a formation of an unit having at least 210 bags which then can be handled by normal pallet transportation apparatus used in every store facility, such as a hand moving apparatus which generally includes a pair of forks which can be easily inserted into the pallet and raised and transported even though the weight of the entire assembled unit is 1,640 pounds. Such assembled unit is stable once it has been "set" and prepared with a cardboard outer wrapping as described. The pallet can be transported easily in a medium temperature truck for an extended period of time without deterioration of the ice.

The preferred embodiment has been utilized in several facilities with an extreme reduction in damaged ice since the ice is not handled by any person other than the ultimate user from the time it is stacked on the pallet until the time it is eventually merchandised in the stores. Any ice left in the bottom of the merchandiser can normally be easily removed and placed on top of the already stacked ice.

The normal procedure is to remove the ice from the store freezer to the ice merchandiser in the store. The cardboard outer wrapping can be removed either in the cooler or at any location between the cooler to the ice merchandiser and discarded. The inner and outer wrapping can be discarded and nothing need be returned to the warehouse.

The entire method provides for warehousing ice which is not normally done under the current ice merchandising systems. Ice, at the present time, is merchandised from the ice company directly to the ice user. Whereas, this system allows the ice companies to warehouse ice at the facility generally used to dispense all of the products to a grocery store. The grocery stores not only receive the standard product from the warehouse, but also can now receive its ice from the warehouse, thus substantially cutting down on the cost of shipping produce to the store. Ice under this system can generally be marketed for less than the ice merchandised under the prior art systems.

It is obvious, of course, that other modifications can be made and still be well within the spirit and scope of this invention as described in the specification and appended claims.

What I claim is:

1. A method for preparing a quantity of prepackaged ice for transportation to a remote location comprising the steps of:
    (a) stacking said quantity of prepackaged ice vertically on a pallet to a predetermined height;
    (b) wrapping said stacked frozen product with material to form a first assembled unit;
    (c) placing said first assembled unit in a freezer having a temperature at or below 20° F.;
    (d) storing said product in said freezer for a period of time until said product has "set";
    (e) boxing said first assembled unit in a rigid container having sidewalls and a lid;
    (f) banding said sidewalls to form a rigid second assembled unit;
    whereby said second assembled unit may be transported or moved to a freezer for storage until being transported to a remote location.

2. The method as claimed in claim 1 wherein said sidewalls are banded by wrapping said boxing with a stretchable material.

3. The method as claimed in claim 1 wherein said prepackaged ice is "set" at 20° F. for at least eight hours.

4. The method as claimed in claim 1 wherein boxing said sidewalls is accomplished by placing a corrugated cardboard container around and over said first assembled unit.

5. A method for preparing a quantity of prepackaged ice for transportation to a remote location comprising the steps of:
    (a) placing a pallet at a location to be loaded;
    (b) placing a piece of insulation material on top of said pallet, sized to cover said pallet;
    (c) stacking said prepackaged ice on top of said insulation material, said stack having a dimension equal to or less than the dimensions of said pallet, and to a predetermined height;
    (d) wrapping said stacked prepackaged ice with a stretchable material from said pallet to the top of said stack to form a first assembled unit;
    (e) placing said first assembled unit in a refrigerated room having a temperature of 20° F. or less for a period sufficient to set said prepackaged ice;
    (f) placing cardboard container material having a height greater than said first assembled unit and having flaps with a length at least as long as the shortest dimension of said pallet, around said first assembled unit to form a box around said pallet;
    (g) banding said cardboard box with material in a manner to secure said cardboard against said first assembled unit;
    (h) moving said flaps to cover said first assembled unit forming a second assembled unit; and
    (i) moving said second assembled unit to a refrigerated room for storage.

6. The method as claimed in claim 5 additionally including the steps of:
    (a) lifting said flaps in a manner to expose the top of said first assembled unit;
    (b) placing pieces of dry ice on top of said first assembled unit;
    (c) returning said flaps to their original position covering said first assembled unit;
    (d) moving said second assemble unit into an enclosed refrigerated truck having a temperature of less than 60° F.;
    (e) transporting said second assembled unit to a food merchandising store; and,
    (f) placing said second assembled unit in a refrigerated location having a temperature of equal to or less than 20° F.

7. The method as claimed in a claim 5 wherein said sidewalls are banded by wrapping said boxing with a stetchable material.

8. The method as claimed in claim 5 wherein said wrapping perfomred by using a plastic film.

* * * * *